(12) United States Patent
Chen et al.

(10) Patent No.: US 11,842,460 B1
(45) Date of Patent: Dec. 12, 2023

(54) BURST IMAGE FUSION AND DENOISING USING END-TO-END DEEP NEURAL NETWORKS

(71) Applicant: Apple Inc., Cupertino, CA (US)

(72) Inventors: Chen Chen, Santa Clara, CA (US); Gustav M. Larsson, San Francisco, CA (US); Jiangkun Liu, San Jose, CA (US); Srikrishna Sridhar, Seattle, WA (US); Abdelrahman Abdelhamed, Toronto (CA)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 17/351,820

(22) Filed: Jun. 18, 2021

Related U.S. Application Data (60) Provisional application No. 63/041,445, filed on Jun. 19, 2020.

(51) Int. Cl.
  *G06T 5/00* (2006.01)
  *G06T 5/50* (2006.01)
(52) U.S. Cl.
  CPC ............... *G06T 5/002* (2013.01); *G06T 5/50* (2013.01); *G06T 2200/24* (2013.01);
  (Continued)
(58) Field of Classification Search
  CPC .. G06T 5/00; G06T 5/002; G06T 5/50; G06T 2200/24; G06T 2207/20081;
  (Continued)

(56) References Cited

U.S. PATENT DOCUMENTS 9,672,601 B2    6/2017    Fergus
10,043,243 B2    8/2018    Matviychuk
(Continued)

OTHER PUBLICATIONS

Balster, Eric J., Yuan F. Zheng, and Robert L. Ewing. "Combined spatial and temporal domain wavelet shrinkage algorithm for video denoising." IEEE Transactions on Circuits and Systems for Video Technology 16.2 (2006): 220-230 (Year: 2006).*

(Continued)

*Primary Examiner* — Edward F Urban
*Assistant Examiner* — Benedict E Lee
(74) *Attorney, Agent, or Firm* — Blank Rome LLP (57) ABSTRACT

Electronic devices, methods, and non-transitory program storage devices for leveraging machine learning to perform improved image fusion and/or noise reduction are disclosed. When a capture request is received, a neural network may be used to perform fusion and denoising operations on a first set of captured input images. According to some embodiments, the neural network's architecture comprises: a first plurality of network layers configured to compute optical flow information between the first set of input images; a second plurality of network layers configured to perform, at least in part, the fusion and denoising operations on the first set of input images; and a third plurality of skip connections between layers of the second plurality of network layers, wherein parameters for each skip connection of the third plurality of skip connections are warped based on at least part of the optical flow information computed by the first plurality of network layers.

20 Claims, 9 Drawing Sheets

(52) U.S. Cl.
CPC ............... *G06T 2207/20081* (2013.01); *G06T 2207/20084* (2013.01); *G06T 2207/20182* (2013.01); *G06T 2207/20221* (2013.01)

(58) Field of Classification Search
CPC . G06T 2207/20084; G06T 2207/20182; G06T 2207/20221
See application file for complete search history.

(56) References Cited

U.S. PATENT DOCUMENTS

| | | | |
|---|---|---|---|
| 11,107,205 B2* | 8/2021 | Hu | ............................ G06T 5/003 |
| 2016/0275377 A1* | 9/2016 | Mathew | ............... G06V 10/764 |
| 2019/0043178 A1 | 2/2019 | Chen | |
| 2019/0045168 A1* | 2/2019 | Chaudhuri | ............ H04N 13/139 |
| 2019/0199943 A1* | 6/2019 | Ulman | ....................... G06T 1/20 |
| 2019/0304068 A1 | 10/2019 | Vogels | |
| 2019/0378247 A1* | 12/2019 | Huang | ..................... G06T 5/003 |
| 2020/0364834 A1* | 11/2020 | Ferrés | .................. H04N 23/683 |
| 2021/0327031 A1* | 10/2021 | Xie | .......................... G06T 7/215 |

OTHER PUBLICATIONS

Zhou, Zongwei, et al. "Unet++: Redesigning skip connections to exploit multiscale features in image segmentation." IEEE transactions on medical imaging 39.6 (2019): 1856-1867. (Year: 2019).*
Ehret, et al., "Model-blind Video Denoising Via Frame-to-frame Training," arXiv:1811.12766v3, Feb. 25, 2020.
Liba, et al., "Handheld Mobile Photography in Very Low Light," arXiv:1910.11336v1, Oct. 24, 2019.
Mildenhall, et al., "Burst Denoising with Kernel Prediction Networks," CVPR 2018.

* cited by examiner

BURST IMAGE FUSION AND DENOISING USING END-TO-END DEEP NEURAL NETWORKS

TECHNICAL FIELD

This disclosure relates generally to the field of digital image processing. More particularly, but not by way of limitation, it relates to techniques for utilizing Deep Neural Networks (DNNs) and end-to-end learning techniques to improve image fusion and denoising.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In traditional image fusion, one of the images to be fused may be designated as the "reference image." The other images that are to be part of the fusion operation may be designated as "non-reference images" or "candidate images," and the non-reference/candidate images are registered to the reference image before the fusion operation. The decision of which image in a set of captured images should serve as the reference image may be based on, e.g., an image quality measure (such as sharpness, face quality, noise level, etc.), a capture timing measure (such as the image captured closest in time to a received capture request, e.g., if images are being captured in a streaming fashion), a device condition measurement (such as an image captured with the least amount of device rotation), or any other image condition or set of conditions desired by a given implementation.

Further, in traditional image fusion, a "distance measure" may be used to determine if the pixels in the candidate images are sufficiently similar to the corresponding pixel in the reference image to be fused. If the distance measure between a given candidate pixel in a candidate image and the corresponding pixel in the reference image is below a distance threshold, e.g., a noise-dependent distance threshold, the candidate pixel is deemed similar, and it may be used to contribute to the fused result for that pixel.

However, there can often be significant capture time differences between the images that are to be fused, and, therefore, the image registration process may not be able to account for local motion within the images, camera shake, and/or rotation between captured images, etc. In these situations, the differences between corresponding pixels in the reference and candidate images may not just be noise—they may instead be differences caused by a failure of the image registration algorithm. For example, a region(s) of the reference image that changes over time across the captured images, e.g., due to object motion or registration errors, may create "ghosting artifacts" in the final fused image. The appearance and characteristics of ghosting artifacts may vary from image to image. For example, a section of the image that has a certain color in the reference image (but that has different colors in the other candidate images) will, when combined with the candidate images, result in a faded look or a false color region that is potentially noticeable by a viewer of the final fused image. On the other hand, an edge area or a textured area that moves over time across the captured images may, when fused, have visible multi-edges (e.g., double edges, triple edges, etc.), which may also be noticeable in the final fused image. In still other instances, so-called occlusion artifacts may appear in fused images wherein some information is missing from at least one of the constituent images being used in the fusion operation. Occlusion artifacts may be caused, e.g., by parallax differences between cameras used to capture the constituent images used in the fusion operation.

Despite these potential difficulties, in general, by fusing multiple images together, a better-quality resultant image may often be achieved than may be obtained from a single image capture. The multiple image captures used in a given fusion operation may comprise: multiple images captured with the same exposure; multiple images captured with different exposures (e.g., for the purposes of highlight recovery, as in the case of High Dynamic Range (HDR) imaging); or a combination of multiple images captured with shorter and longer exposures, e.g., for the purposes of estimating the moving pixels from the shorter exposures and estimating the static pixels from the long exposure(s). Moreover, the captured images to be fused can come from, e.g., the same camera, multiple cameras with different image sensor characteristics, or different processing workflows (such as video capture and still image capture).

In some prior art image fusion and denoising schemes, multiple image heuristics may need to be calculated, tuned, and/or optimized by design engineers (e.g., on a relatively small number of test images), in order to attempt to achieve a satisfactory fusion and denoising result across a wide variety of image capture situations. However, such calculations and optimizations are inherently limited by the small size of the test image sets from which they were derived. Further, the more complicated that such calculations and optimizations become, the more computationally-expensive such fusion techniques are to perform on a real-world image capture device. Thus, what is needed is an approach to leverage machine learning-techniques to improve the fusion and noise reduction of bracketed captures of arbitrary exposures, wherein the improved fusion and noise reduction techniques are optimized over much larger training sets of images, e.g., wholly or partially synthetically-rendered images with known amounts of synthetically-generated noise added.

SUMMARY

Devices, methods, and non-transitory program storage devices are disclosed herein that leverage machine learning (ML) and other artificial intelligence (AI)-based techniques (e.g., Deep Neural Networks) to improve image fusion and/or noise reduction, in order to generate low noise and high dynamic range images in a wide variety of capturing conditions in a memory-efficient and computationally-efficient manner.

More particularly, an incoming image stream may be obtained from one or more image capture devices, e.g., embedded in a personal electronic device, wherein the incoming image stream comprises a variety of image captures, which may be, e.g., received in a particular sequence and/or according to a particular pattern. When an image capture request is received, the method may obtain a first set of input images from the incoming image stream that are to be included in a subsequent fusion and denoising operation.

According to some embodiments, a first neural network is obtained having a first network architecture, wherein the first network architecture is configured to perform a fusion operation and a denoising operation on sets of input images. In some embodiments, the first network architecture comprises: a first plurality of network layers configured to compute optical flow information between a first set of input images; a second plurality of network layers configured to perform, at least in part, the fusion and denoising operations on the first set of input images; and a third plurality of skip connections between layers of the second plurality of network layers, wherein parameters for each skip connection of the third plurality of skip connections are warped based on at least part of the optical flow information computed by the first plurality of network layers. As mentioned above, the first neural network, once trained to satisfaction, may then be used to perform fusion and denoising operations simultaneously on sets of input images.

The aforementioned first neural network may have many possible network architectures. For example, according to some embodiments, the network architecture is further configured to perform temporal denoising (i.e., denoising across corresponding portions of images captured over a duration of time) prior to performing spatial denoising (i.e., denoising of different portions of a given image). According to other embodiments, the network architecture is further configured to spatial denoising prior to performing temporal denoising. According to still other embodiments, the network architecture is further configured to perform the denoising operation and the fusion operation concurrently. According to yet other embodiments, the computation of optical flow information between images in the set of images being denoised is not necessary.

According to some embodiments, during the training of the first neural network, one or more loss functions may be employed. For example, in some embodiments, a loss function related to the denoising operation (e.g., a function measuring how close the network's denoising is getting to the ground truth noise-free image) and/or auxiliary loss functions related to the fusion operation (e.g., loss functions related to an optical flow estimation, an occlusion estimation process, or the fusion weights of the input frames) may be used. In some such embodiments, the auxiliary loss function related to the fusion and/or denoising operations may be turned off at a first time during a training of the first neural network, e.g., so that the network may reach convergence in a reasonable time period and with the desired characteristics.

In other embodiments, the network architecture may further comprise at least one confidence value parameter for at least part of the computed optical flow information for the set of input images being registered and/or denoised.

In still other embodiments, the first neural network may be trained to determine a plurality of optimized weight parameters for the first neural network using synthetically-generated training data. In some such embodiments, the synthetically-generated training data may comprise one or more of: one or more wholly- or partially-synthetically-generated images; optical flow information for at least one of the one or more synthetically-generated images; and synthetically-generated noise information for at least one of the one or more wholly- or partially-synthetically-generated images. In some such embodiments, the synthetically-generated training data may be generated, at least in part, using a graphics rendering engine. In some cases, the synthetically-generated training data may be generated on the same computing node that the first neural network is trained on. In some embodiments, the one or more synthetically-generated images comprises a first set of images, wherein the first set of images comprises a reference image and one or more non-reference images, and wherein optical flow information exists between the reference image and each non-reference image in the first set of images.

Various non-transitory program storage device embodiments are disclosed herein. Such program storage devices are readable by one or more processors. Instructions may be stored on the program storage devices for causing the one or more processors to perform any of machine learning-enhanced image fusion and/or noise reduction techniques disclosed herein.

Various methods of performing machine learning-enhanced image fusion and/or noise reduction are also disclosed herein, in accordance with the techniques disclosed herein. Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Discussion will now turn to the nomenclature that will be used herein to refer to the various differently-exposed images from an incoming image stream. As in conventional bracket notation, "EV" stands for exposure value and refers to a given exposure level for an image (which may be controlled by one or more settings of a device, such as an image capture device's shutter speed and/or aperture setting). Different images may be captured with similar EVs or at different EVs, wherein a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV−" image refers to an underexposed image that is captured at a lower stop (e.g., 0.5, 1, 2, or 3 stops) than would be used to capture an EV0 image. For example, an "EV−1" image refers to an underexposed image that is captured at one stop below the exposure of the EV0 image, and "EV−2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, the incoming image stream may comprise a combination of: EV−, EV0, EV+, and/or other longer exposure images. It is further noted that the image stream may also comprise a combination of arbitrary exposures, as desired by a given implementation or operating condition, e.g., EV+2, EV+4, EV−3 images, etc.

As mentioned above, in image fusion, one of the images to be fused is typically designated as the reference image for the fusion operation, to which the other non-reference or "candidate" images involved in the fusion operation are registered. Reference images are often selected based on being temporally close in capture time to the moment that the user wishes to "freeze" in the captured image. In order to more effectively freeze the motion in the captured scene, reference images may have a relatively shorter exposure time (e.g., shorter than a long exposure image) and thus have undesirable amounts of noise.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range). A long exposure image may come from a single image captured from a single camera, or, in other instances, a long exposure image may be synthesized from multiple captured images that are fused together.

In some embodiments, the particular exposure time (and/or system gain) of a captured image may be based, at least in part, on ambient light levels around the image capture device(s), with brighter ambient conditions allowing for comparatively shorter long exposure image exposure times, and with darker ambient conditions allowing the use of comparatively longer long exposure image exposure times. In still other embodiments, the particular exposure time (and/or system gain) of a long exposure image may be further based, at least in part, on whether the image capture device is using an Optical Image Stabilization (OIS) system during the capture operation.

It is to be noted that the noise level in a given image may be estimated based, at least in part, on the system's gain level (with larger gains leading to larger noise levels). Therefore, in order to have low noise, an image capture system may desire to use small gains. However, the brightness of an image may be determined by the product of exposure time and gain. So, in order to maintain the image brightness, low gains are often compensated for with large exposure times. However, longer exposure times may result in motion blur, e.g., if the camera doesn't have an OIS system and/or if there is significant camera shake during the long exposure image capture. Thus, for cameras that have an OIS system, exposure times could range up to the maximum threshold exposure time in low light environments, which would allow for the use of a small gain—and hence less noise. However, for cameras that do not have an OIS systems, the use of very long exposure times will likely result in motion blurred images, which is often undesirable.

According to some embodiments, the incoming image stream may comprise a particular sequence and/or particular pattern of exposures. For example, according to some embodiments, the sequence of incoming images may comprise: EV0, EV−, EV0, EV−, and so forth. In other embodiments, the sequence of incoming images may comprise images with the same exposure settings, e.g., only EV0 images. In response to a received capture request, according to some embodiments, the image capture device may take one (or more) long exposure images. After the long exposure capture, the image capture device may return to a particular sequence of incoming image exposures, e.g., the aforementioned: EV0, EV−, EV0, EV− sequence. The sequence of exposures may, e.g., continue in this fashion until a subsequent capture request is received, the camera(s) stop capturing images (e.g., when the user powers down the device or disables a camera application), and/or one when or more operating conditions may change.

In still other embodiments, the image capture device may capture one or more images in rapid succession, also referred to herein as a "burst capture" operation. According to some embodiments, the images in the incoming image stream may be captured as part of a preview operation of a device, or otherwise be captured while the device's camera(s) are active, so that the camera may more quickly react to a user's capture request. Returning to the sequence of incoming images may ensure that the device's camera(s) are ready for the next image capture request.

Exemplary Image Processing Pipelines

Figure 1A:
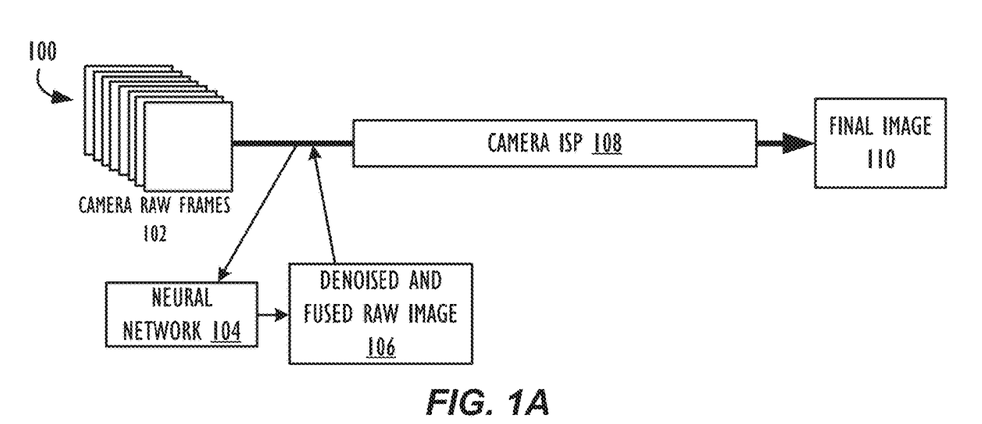
FIGS. 1A-1C illustrate exemplary image processing pipelines to be used in a machine learning-enhanced image fusion and/or noise reduction method, according to one or more embodiments.
Figure 1B:
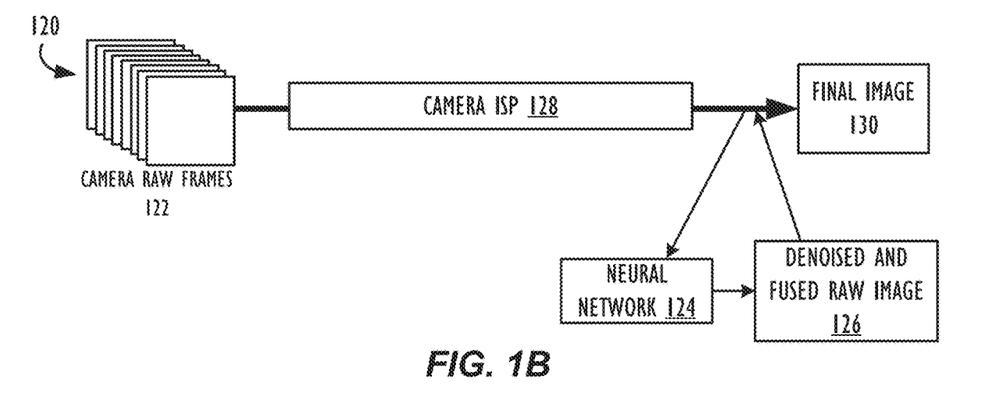
Figure 1C:
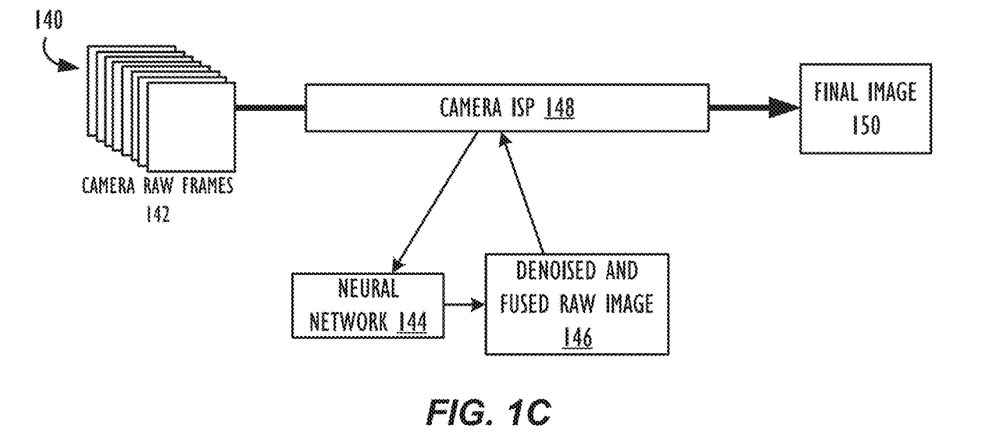

FIGS. 1A-1C illustrate exemplary image processing pipelines to be used in a machine learning-enhanced image fusion and/or noise reduction method, according to one or more embodiments. In particular, FIG. 1A illustrates a pipeline 100, wherein neural network 104 operates in hardware, e.g., directly on camera raw frames 102, to produce denoised and fused raw image 106 prior to passing the information to the camera's Image Signal Processor (ISP) 108 and the generation of the final image 110. Benefits of pipeline 100 may include improved performance for the denoising and fusion operations by being run directly on camera hardware (e.g., due to a simplified noise model).

By contrast, FIG. 1B illustrates a pipeline 120, which operates on camera raw frames 122, wherein neural network 124 operates on the output of the camera's ISP 128, to produce denoised and fused raw image 126 just prior to any post-processing performed to generate the final image 130. Benefits of pipeline 120 may include ease of implementation, since no modification would be required to camera ISP 128 hardware.

Finally, FIG. 1C illustrates a pipeline 140, wherein neural network 144 operates as a part of the camera's ISP 148, to produce denoised and fused raw image 146 prior to any post-processing performed to generate the final image 150. Benefits of pipeline 130 may include faster processing times, due to the smaller size of camera raw frames 142.

Exemplary Neural Network Architectures

Figure 2:
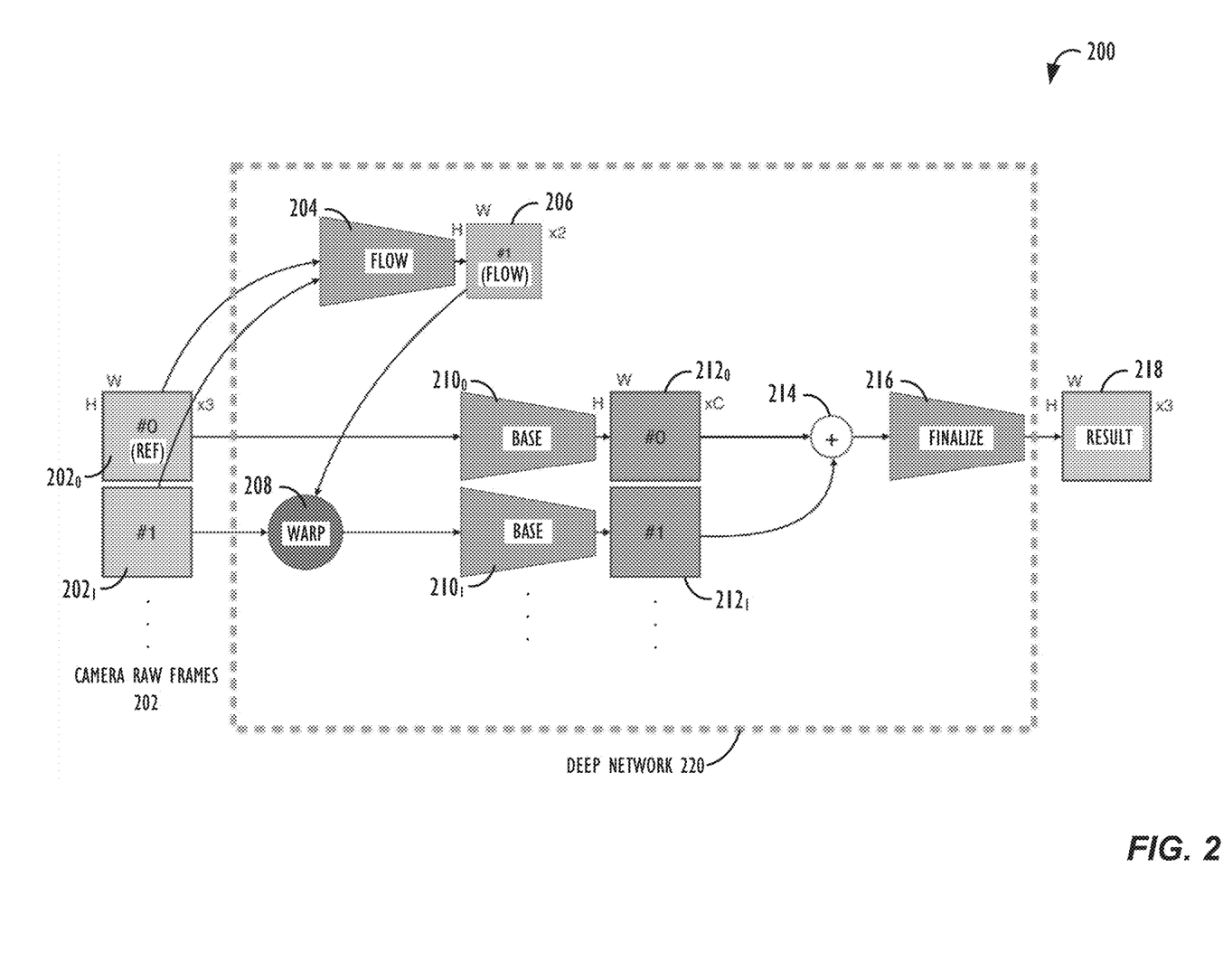
FIG. 2 is an example of a neural network architecture that may be used for performing machine learning-enhanced image fusion and/or noise reduction, wherein temporal denoising operations are performed before spatial denoising operations, according to one or more embodiments.

Referring now to FIG. 2, an example of a neural network architecture 200 that may be used for performing machine learning-enhanced image fusion and/or noise reduction is shown, wherein temporal denoising operations are performed before spatial denoising operations, according to one or more embodiments. As shown on the left side of FIG. 2, two or more input camera raw frames 202 may be captured and used as input to deep network 220. Each input camera raw frame 202 may have common dimensions and resolutions (e.g., a width (W) and height (H)), or one or more input frames may have differing dimensions and/or resolutions.

Each image may be comprised of a number of channels of image data (e.g., ×3 channels, in the case of R-G-B image data). Other numbers of channels are also possible (e.g., ×4 channels, in the case of RGBD raw image data). One input image may be either designated or determined to serve as the reference image ("Ref" image, as illustrated in FIG. 2) for the joint fusion and denoising operations. In the exemplary embodiment of neural network architecture 200, Image #0 ($202_0$) has been designated to serve as the reference image.

As illustrated in the exemplary embodiment of neural network architecture 200, one or more portions of the network 204 may be dedicated to determining optical flow ("Flow," as illustrated in FIG. 2) information regarding the image frames 202. According to some embodiments, optical flow may be estimated on a per-pixel basis for each non-reference image, with respect to the reference image. In some embodiments, optical flow portion 204 may produce output, e.g., in the form of an optical flow map 206, which may have the same dimensions as the camera raw frames 202. As illustrated, optical flow map 206 may comprise two channels of information (e.g., a magnitude and a direction for each pixel), reflecting how each pixel in a non-reference image would need to be moved to match with its corresponding pixel in the reference image. According to other embodiments, the optical flow information for a given input image frame 202 may also be constrained to be a global homography (i.e., a projective transform). The network 204 would then produce the parameters (e.g., six parameters) that define the projective transform, i.e., rather than the dense optical flow map 206 embodiments, described immediately above.

As illustrated in the exemplary embodiment of neural network architecture 200, the use of optical flow map 206 may be used to warp 208 the non-reference images (e.g., $202_1$) to the reference image (e.g., $202_0$) prior to the application of base network layers 210. This has the effect of accounting for temporal differences in the camera raw frames (202), e.g., movement of the camera and/or objects in the captured scene during the duration of the capture of camera raw frames 202, prior to any of the spatial denoising is applied by the network 220 (e.g., either in the base network layers 210 or the finalize layers 216).

The output of base network layers 210 may comprise denoised image representations 212. As illustrated, the denoised image representations 212 may have the same dimensions as the input images but have many more channels (represented by "xC" in FIG. 2, i.e., 'C' may have some value larger than the 3 channels that the input images had) than the original camera raw frames 202. For this reason, the data regarding the various denoised image representations must be combined in some fashion at node 214 (e.g., via a weighted combination, interpolation operation, or other desired technique), and the finalize portion of the network 216 also must comprise at least one layer, i.e., to reduce the data from C channels back down to the original number (e.g., 3) channels for the resulting output image 218. According to some embodiments, the reduction may comprise a fully-connected 1×1 convolution that takes the image data from C channels to 3 channels.

According to some embodiments, the exemplary neural network architecture 200 may be trained via an end-to-end learning process, wherein all of the network elements within deep network 220 can be updated and optimized together during a single network training process. As may be understood, the base network layers 210, optical flow portion 204, and the finalize portion of the network 216 are distinct parts of the overall deep network 220, and each part may contain several convolutional layers or blocks and have some denoising capabilities of their own.

Figure 3A:
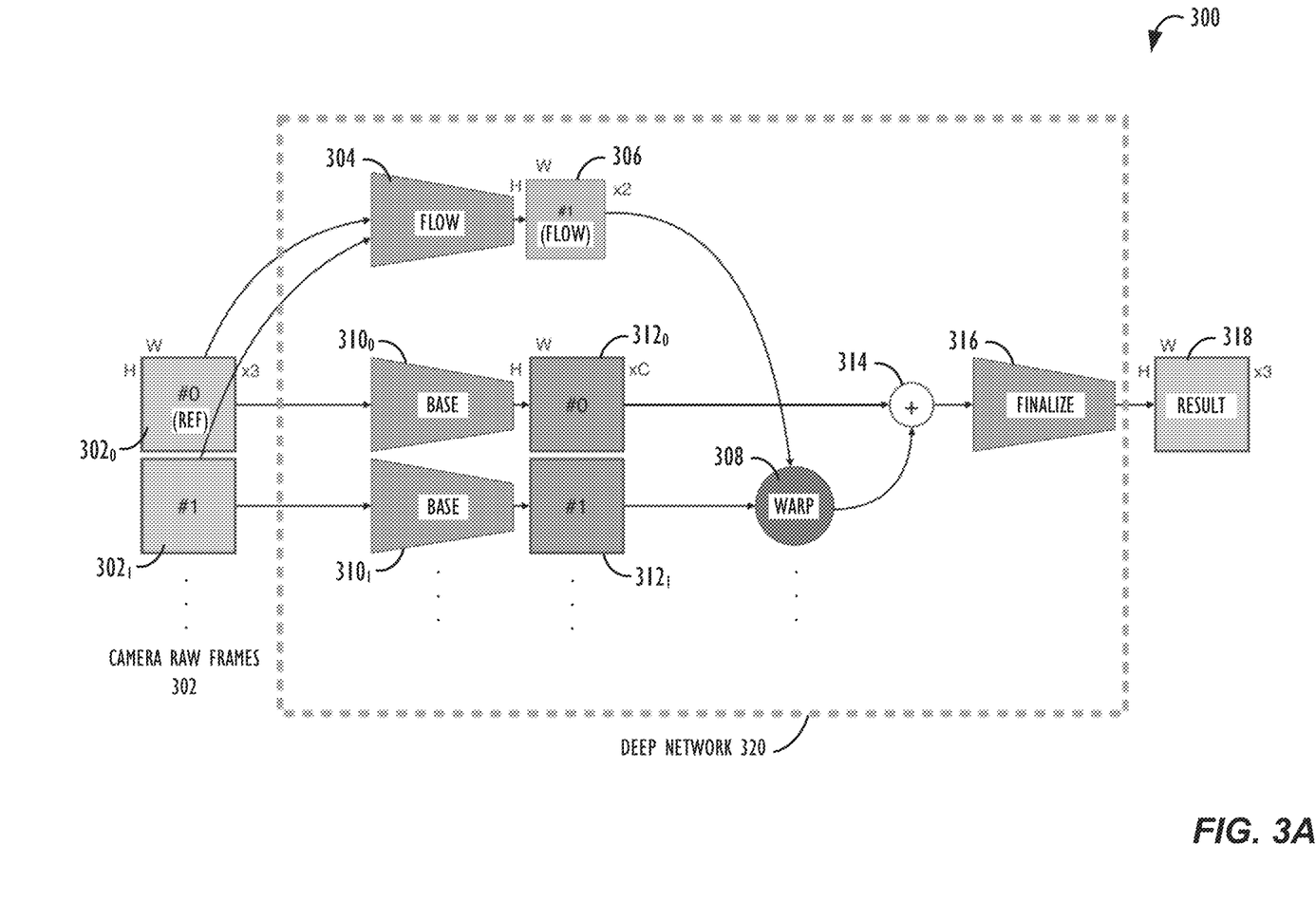
FIG. 3A is an example of a neural network architecture that may be used for performing machine learning-enhanced image fusion and/or noise reduction, wherein spatial denoising operations are performed before temporal denoising operations, according to one or more embodiments.

Referring now to FIG. 3A, another example of a neural network architecture 300 that may be used for performing machine learning-enhanced image fusion and/or noise reduction is shown, wherein spatial denoising operations are performed before temporal denoising operations, according to one or more embodiments. Similar to FIG. 2, two or more input camera raw frames 302 may be captured and used as input to deep network 320. As illustrated in the exemplary embodiment of neural network architecture 300, one or more portions of the network 304 may be dedicated to determining optical flow ("Flow," as illustrated in FIG. 3) information regarding the image frames 302.

As illustrated in the exemplary embodiment of neural network architecture 300, the use of optical flow map 306 may be used to warp 308 the non-reference images (e.g., $302_1$) to the reference image (e.g., $302_0$) after the application of base network layers 310 to produce denoised image representations 312. This has the effect of accounting for temporal differences in the camera raw frames (302), e.g., movement of the camera and/or objects in the captured scene during the duration of the capture of camera raw frames 302, after any of the spatial denoising is applied by the network 320 (e.g., in the base network layers 310).

As illustrated, each denoised image representation 312 may have the same dimensions as the input images but have many more channels (represented by "K" in FIG. 3) than the original camera raw frames 302. For this reason, once the non-reference image has been warped at 308, the data regarding the various denoised image representations 312 must be combined in some fashion at node 314, and the finalize portion of the network 316 also must comprise at least one layer, i.e., to reduce the data from C channels back down to the original number (e.g., three) channels for the resulting output image 318.

One potential drawback of neural network architecture 300 is the difficulty in reducing the dimensionality of the data while it is being operated on by the network. For example, because of the location of warping operations 308 within the network architecture, high frequency information that is difficult to store in intermediate representations (and typically sent to other layers using so-called "skip connections") may not be able to be successfully transmitted using skip connections, (unless, e.g., the information in each skip connection is also individually warped, as will be discussed in greater detail below with respect to other embodiments) may need to be stored in high-dimensionality in many of the layers of the network.

Figure 3B:
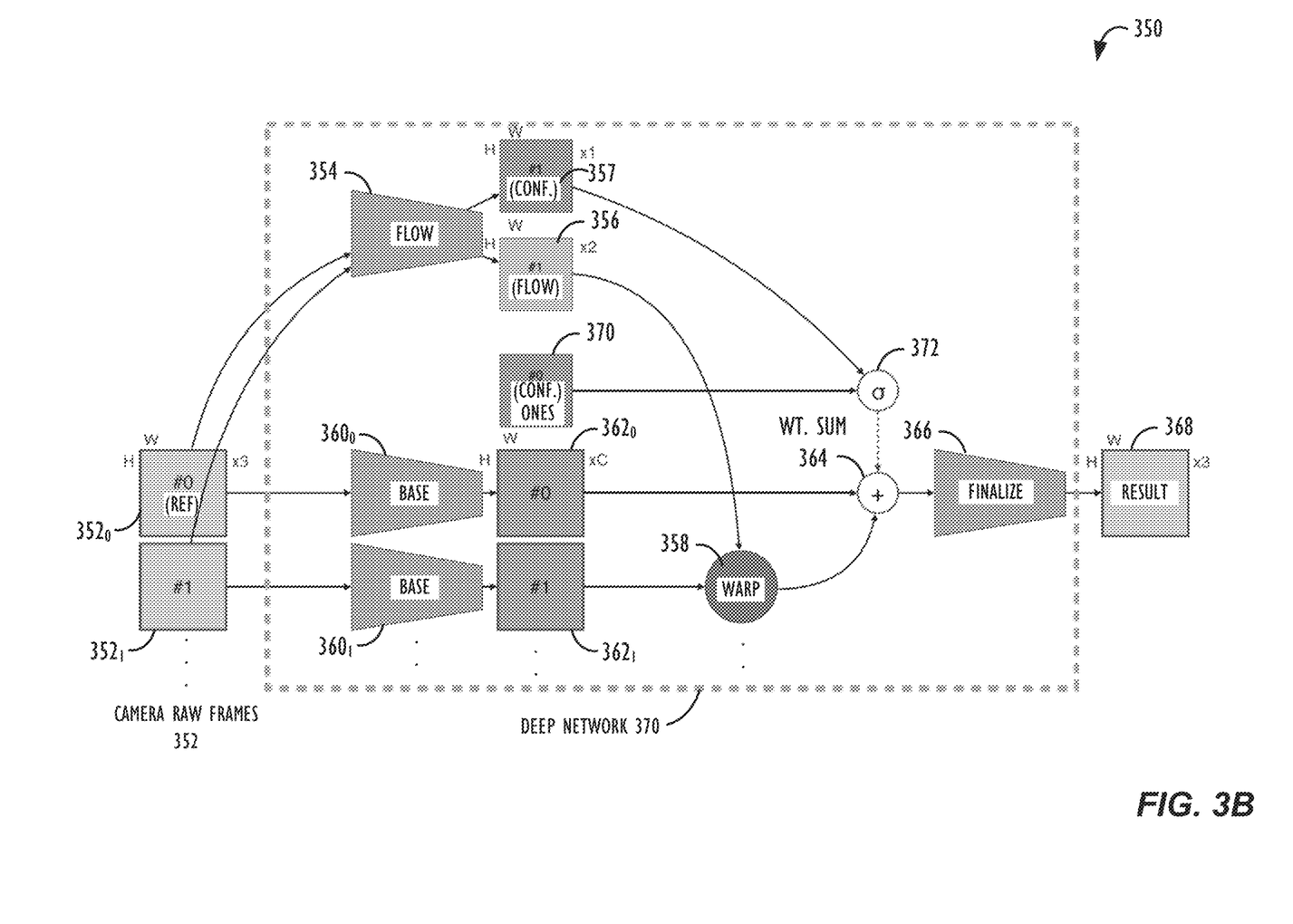
FIG. 3B is an example of a neural network architecture that may be used for performing machine learning-enhanced image fusion and/or noise reduction, wherein spatial denoising operations are performed before temporal denoising operations and confidence weights are used, according to one or more embodiments.

Referring now to FIG. 3B, an example of a neural network architecture 350 that may be used for performing machine learning-enhanced image fusion and/or noise reduction is shown, wherein spatial denoising operations are performed before temporal denoising operations and confidence weights are used, according to one or more embodiments. The design of neural network architecture 350 is similar to that of neural network architecture 300 (including a deep network 370, comprising base network layers 360 and denoised image representations 362, which are warped 358 according to optical flow map 356), except that neural network architecture 350 of FIG. 3B has an additional confidence parameter map 357, which may also be produced by the optical flow portion of the network 354. In some cases, confidence parameter (σ) 357 may also be used as a debugging signal during training to tune the network and help interpret which constituent images are contributing to the final image and to what degree. For example, in some embodiments, a confidence parameter may reflect the degree of confidence in the optical flow estimation for a given image. In other words, a σ value of 0 may indicate that the estimate is highly uncertain, and thus, the image portion should not contribute at all to the fusion result, whereas higher σ values indicate that a given image portion can have a greater contribution to the fusion operation.

According to some embodiments, the confidence parameter map 357 may comprise a two-dimensional map providing a confidence value in the optical flow estimate for each pixel in a constituent image 352. At block 372, the confidence parameters, σ, may be combined with an all 'ones' confidence mask 370 and used to weight the contributions of the various constituent images to the fusion operation at block 364, wherein the confidence-weighted sum of the representations of the (at least partially) denoised constituent images 352 are passed to the finalize portion of the network 366, which, again, must comprise at least one layer, i.e., to perform any final denoising and reduce the data from C channels back down to the original number (e.g., three) channels for the resulting output image 368. In some embodiments, the aforementioned ones confidence mask 370 may be used to help avoid overparameterization during the confidence parameter weighting process, e.g., by being placed over the reference frame $352_0$. This may also have the effect of anchoring the confidence of the reference frame to a value of '1,' and letting each of the other constituted images be either less important or more important, based on respective confidence parameters.

Figure 3C:
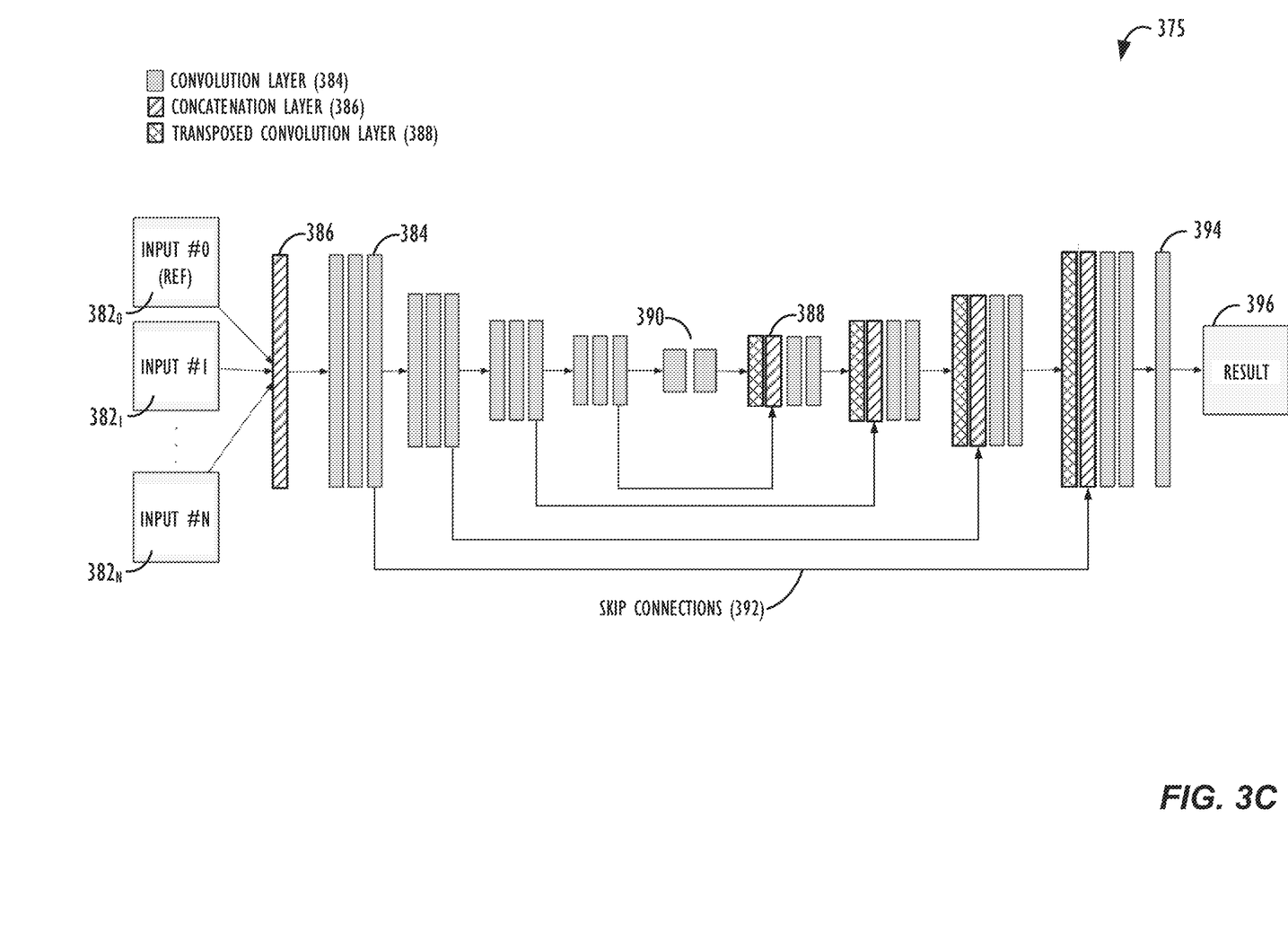
FIG. 3C is an example of a neural network architecture that may be used for performing machine learning-enhanced image fusion and/or noise reduction, wherein the use of optical flow information is not necessary, according to one or more embodiments.

Referring now to FIG. 3C, a neural network architecture 375 that may be used for performing machine learning-enhanced image fusion and/or noise reduction is shown, wherein the use of optical flow information is not necessary, according to one or more embodiments. Similar to FIGS. 2 and 3A-3B, two or more input camera raw frames 382 may be captured and used as input to neural network architecture 375. However, as illustrated in the exemplary embodiment of FIG. 3C, there are no portions of the network 375 dedicated to determining optical flow estimate information regarding the image frames 382. Instead, neural network 375 comprises an architecture, wherein the channels of the input image frames 382 are concatenated (e.g., by concatenation layer 386) before going through a convolutional neural network, e.g., a U-Net or similar design, and directly output the resulting image 392.

As is typical in a U-Net, each layer in the so-called "contracting path" of the network may operate on smaller and smaller scale representations of the input image data, until reaching the central or 'bottleneck' layer 390. A typical layer on the contracting path may comprise a number of convolutional layers (384), e.g., each followed by a rectified linear unit (ReLU) and a pooling operation (e.g., max pooling, averaging pooling, or stride convolution). In the contracting path, the spatial extent of the image information may be reduced (e.g., by a factor of 2) with each successive layer, while the feature information is increased. In the so-called "expanding path," beginning after bottleneck layer 390, the network 375 may begin to combine the feature and spatial information through a sequence of up-convolutions and concatenations with high-resolution features from the contracting path (e.g., as passed through the network via optional skip connections 392). The expanding path may also employ one or more transposed convolution (and/or upsampling) layers 388 at each level. Finally, at layer 394, a 1×1 convolution may be applied (e.g., with no ReLU) that takes the image data from C channels back down to 3 channels to generate the resulting output image 396.

Figure 4:
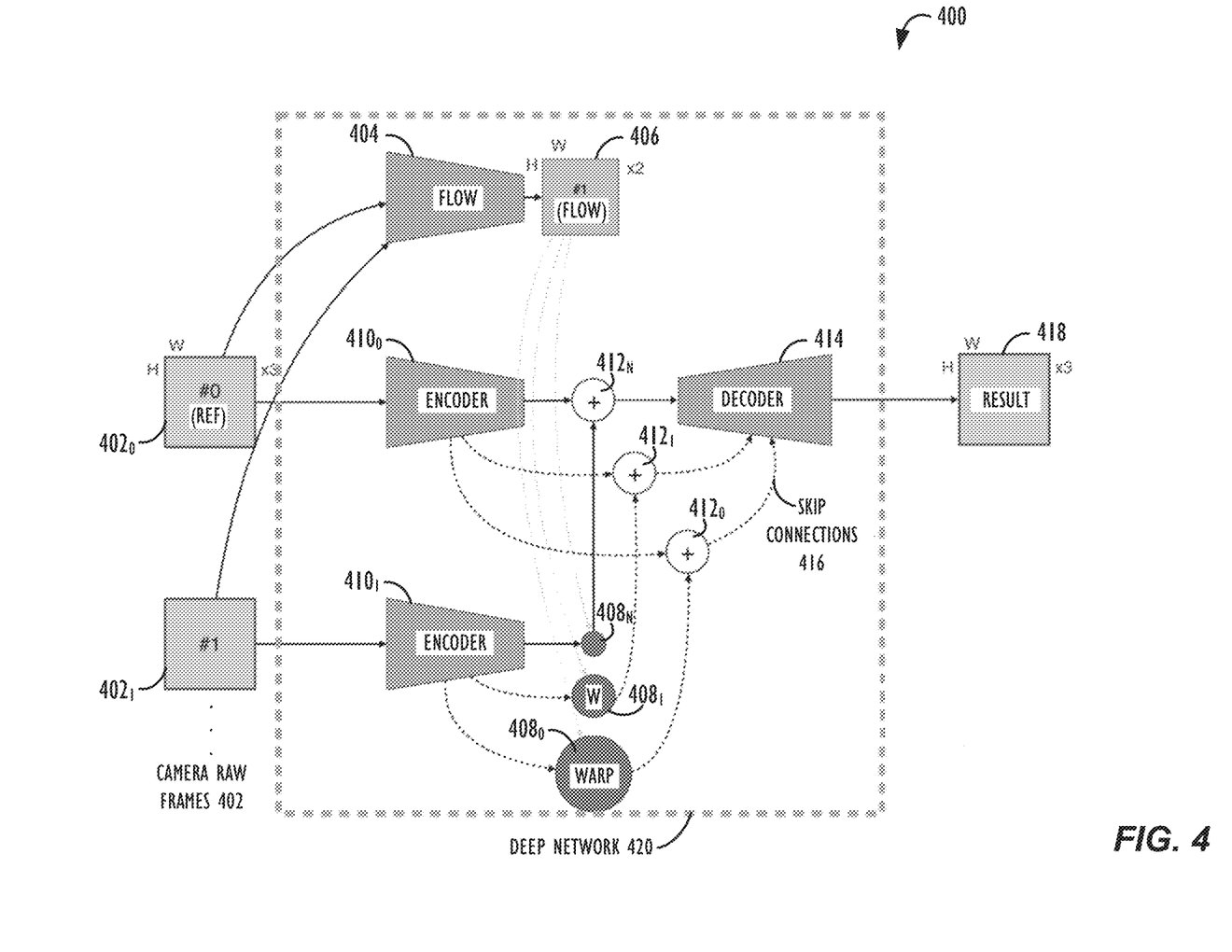
FIG. 4 is an example of a neural network architecture that may be used for performing machine learning-enhanced image fusion and/or noise reduction, wherein spatial denoising operations are performed before temporal denoising operations and multiple encoders are used along with a single decoder, according to one or more embodiments.

Referring now to FIG. 4, an example of a neural network architecture 400 that may be used for performing machine learning-enhanced image fusion and/or noise reduction is shown, wherein spatial denoising operations are performed before temporal denoising operations and multiple encoders are used along with a single decoder, according to one or more embodiments. As with FIGS. 2 and 3, two or more input camera raw frames 402 may be captured and used as input to deep network 420. As illustrated in the exemplary embodiment of neural network architecture 400, one or more portions of the network 404 may be dedicated to determining optical flow ("Flow," as illustrated in FIG. 4) information regarding the image frames 402.

The optical flow maps 406 generated by portion 404 of the network 420 may be used to warp ($408_n$) the non-reference images (e.g., $402_1$) to the reference image (e.g., $402_O$) after the application of base network encoder layers 410. As illustrated, representations of each non-reference image 402 may be encoded and warped at different resolutions (e.g., with larger circles 408 in FIG. 4 indicating higher resolution representations of the respective image frame 402). As mentioned above, high frequency information that is difficult to store in intermediate representations may, in some cases, be sent to other layers of the deep network using skip connections 416. In the example of deep network 420, the information in each skip connection 416 may be individually warped before being sent to the finalize portion of the network, i.e., decoder 414, and combined into the resulting output image 418. Aligning the input images in pixel space (i.e., the traditional method of image alignment in fusion operations) is memory efficient and easier to debug. By contrast, aligning input images in feature space (e.g., when they are represented with more than three channels of information per image) is more costly and harder to debug, but avoids the information loss that happens when an image is re-sampled (i.e., warped), thereby producing higher quality results.

Once each of the non-reference image has been warped at the appropriate resolution level 408, the data regarding the various denoised image representations must be combined in some fashion at nodes $412_n$ with the respective corresponding resolution-level representations of the reference image $402_O$. The finalize portion of the network, i.e., decoder 414, which also must comprise at least one layer, may be used to reduce the fused and (at least partially) denoised data from C channels back down to the original number (e.g., three) channels for the resulting output image 418. As may now be appreciated, deep network 420 comprises multiple encoder portions 410 and a single decoder portion 414.

Exemplary Fusion and Denoising Operations

Figure 5A:
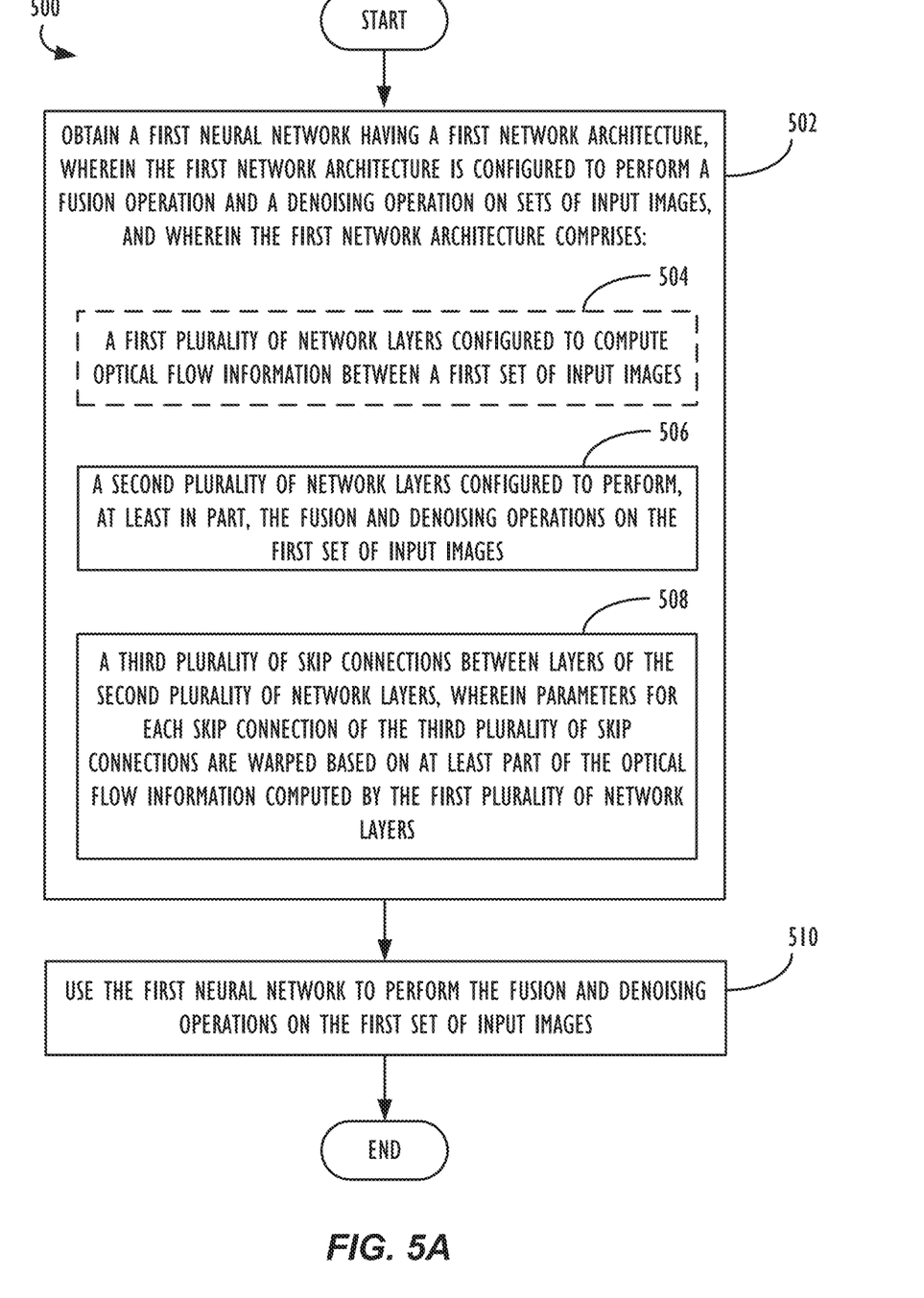
FIG. 5A is flow chart illustrating a method of performing machine learning-enhanced image fusion and/or noise reduction, according to one or more embodiments.

Referring now to FIG. 5A, a flow chart illustrating a method 500 of performing machine learning-enhanced image fusion and/or noise reduction is shown, according to one or more embodiments. First, at Step 502, the method 500 may obtain a first neural network having a first network architecture, wherein the first network architecture is configured to perform a fusion operation and a denoising operation on sets of input images, and wherein the first network architecture comprises: a first plurality of network layers configured to compute optical flow information between a first set of input images (504); a second plurality of network layers configured to perform, at least in part, the fusion and denoising operations on the first set of input images (506); and a third plurality of skip connections between layers of the second plurality of network layers, wherein parameters for each skip connection of the third plurality of skip connections are warped based on at least part of the optical flow information computed by the first plurality of network layers (508). As described above, e.g., in reference to FIG. 3C, in some embodiments, Step 504 may be omitted, i.e., there does not necessarily have to be a portion of the first neural network dedicated to computing optical flow information. The first neural network may then be used to perform the fusion and denoising operation on the first set of input images (510).

As described above in the various embodiments of FIG. 2 through FIG. 4, various neural network architectures are possible, and, due to the end-to-end nature of the training process performed on the network, it may not be possible to determine exactly which portions of the neural network are performing (and to what extent) the fusion operations and which portions of the neural network are performing (and to what extent) the denoising operations on the sets of input images. As may be appreciated, certain portions of the neural network may simultaneously be performing both fusion and denoising operations on the sets of input images, e.g., if the network determined during the training stages that that was the optimal way for the network to reach its desired result of a single, fused and denoised output image. As another example of network architecture variation within the scope of the present disclosure, the first network architecture may be configured to perform temporal denoising: prior to performing spatial denoising; after performing spatial denoising; or concurrently with spatial denoising.

As yet another example of network architecture variation within the scope of the present disclosure, one or more loss functions may be used during the training of the neural network. For example, in some embodiments, the first network architecture may comprise an auxiliary loss function related to the fusion operation and/or the denoising operation. In some cases, it may be beneficial to "turn off" one or more of the auxiliary loss functions related to the fusion and/or denoising operation at a first time during a training of the first neural network, e.g., once the network has converged to its optimal solution by a certain amount. Turning off an auxiliary loss function during training may prove beneficial, as leaving an auxiliary loss function related to, say, optical flow or occlusion, on for too long during the training process of the network may result in the network seeking out an optimal solution that is too focused on learning the optical flow signal or fixing occlusions, and not focused enough on finding a solution to the primary network tasks of fusion and/or denoising the input set of images.

Exemplary Neural Network Training Operations

Figure 5B:
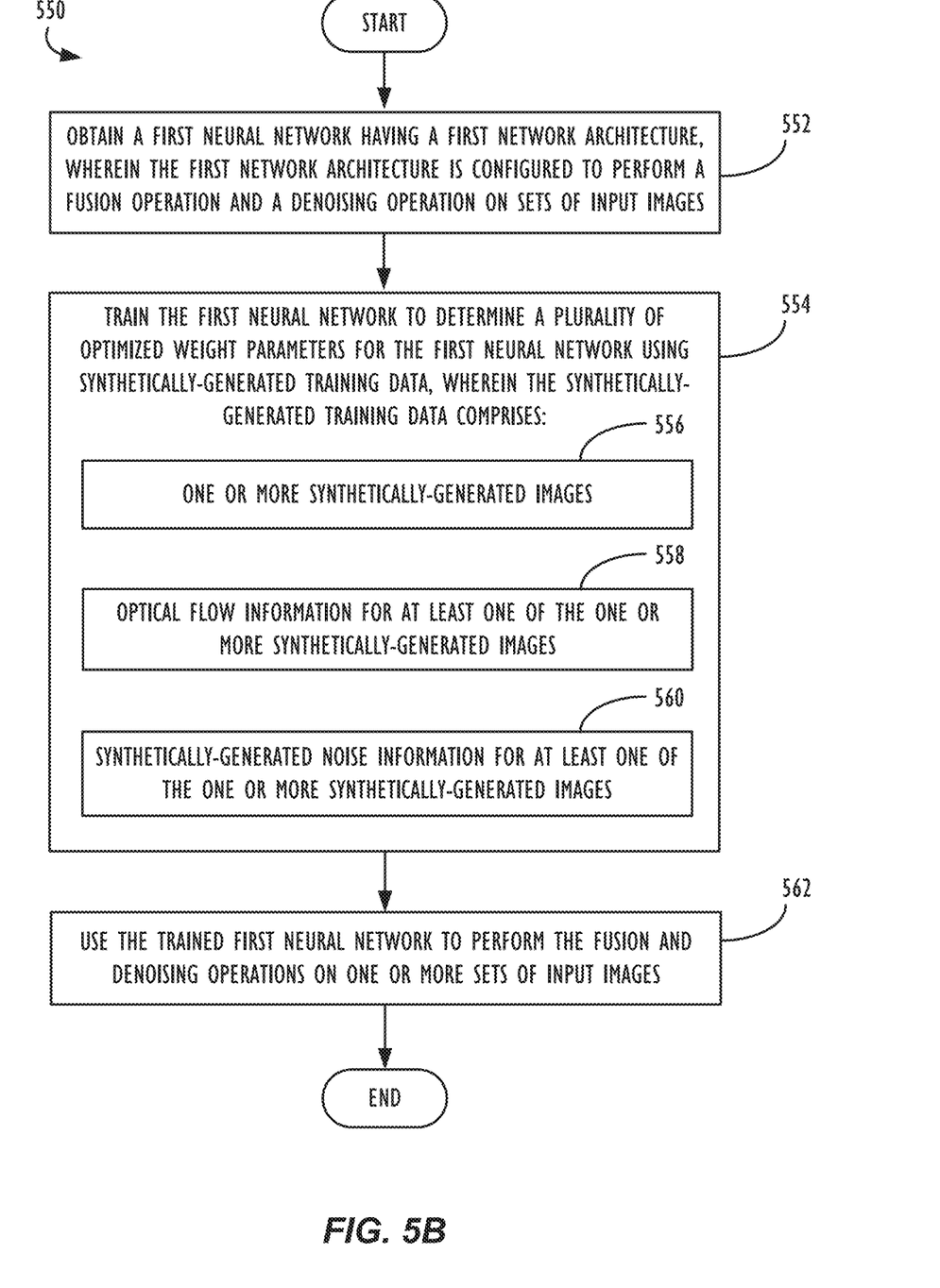
FIG. 5B is flow chart illustrating a method of training a machine learning-model for enhanced image fusion and/or noise reduction using synthetically-generated training data, according to one or more embodiments.

Referring now to FIG. 5B, a flow chart illustrating a method 550 of training a machine learning-model for enhanced image fusion and/or noise reduction using synthetically-generated training data is shown, according to one or more embodiments. First, at Step 552, the method 550 may obtain a first neural network having a first network architecture, wherein the first network architecture is configured to perform a fusion operation and a denoising operation on sets of input images. At Step 554, the method 550 may begin to train the first neural network to determine a plurality of optimized weight parameters for the first neural network using synthetically-generated training data, wherein the synthetically-generated training data may comprise: one or more synthetically-generated images (556); optical flow information for at least one of the one or more synthetically-generated images (558); and/or synthetically-generated noise information for at least one of the one or more synthetically-generated images (560).

According to some embodiments, the synthetically-generated training data could comprise images rendered by composing 3D graphical objects onto real image backgrounds (i.e., image backgrounds captured by a real camera). In such a scenario, the ground truth motion data (e.g., optical flow information for the input set of images) and ground truth denoised image results are known during training and may be used to guide the network during training. In other embodiments, the synthetically-generated training data could comprise entirely generated images, e.g., images generated by a 3D or other game rendering engine. In some embodiments, simulated noise may be added to the synthetically-generated training data, which the network will learn how to remove.

In some embodiments, the rendering of synthetically-generated training data may take place on the same computing node that the training is happening on, thus obviating the need to pre-render the training data. Having full control over the generation of the training data also allows the entity training the network to easily change the distribution of the training data on-the-fly, e.g., to tweak the amount (or type) of motion data being synthesized in the rendered scenes, to control motion of the virtual "camera" capturing the scene, to control the amount (or type) of synthetic noise being added to the rendered scenes, etc. As may be understood, the more closely that the synthetically-generated training data matches the types of scenes (and noise levels) that an imaging device is likely to confront in the real world, the more effective the trained network will likely be at handling the fusion and denoising of the real-world captured image frames.

Exemplary Electronic Computing Devices

Figure 6:
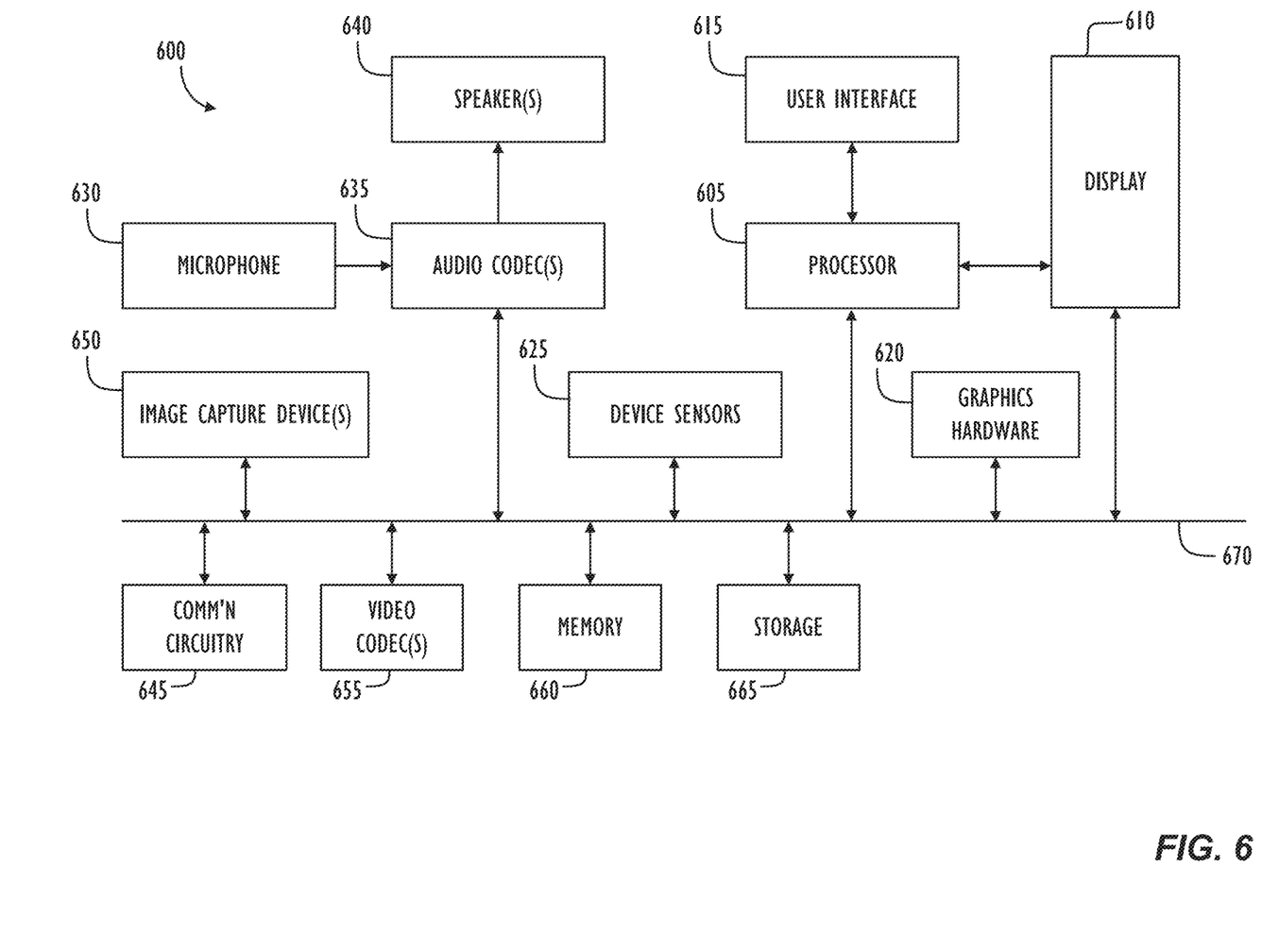
FIG. 6 is a block diagram illustrating a programmable electronic computing device, in which one or more of the techniques disclosed herein may be implemented.

Referring now to FIG. 6, a simplified functional block diagram of illustrative programmable electronic computing device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer, inertial measurement unit, and/or gyroscope), microphone 630, audio codec(s) 635, speaker(s) 640, communications circuitry 645, image capture device 650, which may, e.g., comprise multiple camera units/optical image sensors having different characteristics or abilities (e.g., Still Image Stabilization (SIS), HDR, OIS systems, optical zoom, digital zoom, etc.), video codec(s) 655, memory 660, storage 665, and communications bus 670.

Processor 605 may execute instructions necessary to carry out or control the operation of many functions performed by electronic device 600 (e.g., such as the generation and/or processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 610 may display a video stream as it is captured while processor 605 and/or graphics hardware 620 and/or image capture circuitry contemporaneously generate and store the video stream in memory 660 and/or storage 665. Processor 605 may be a system-on-chip (SOC) such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 650 may comprise one or more camera units configured to capture images, e.g., images which may be processed to generate fused versions of said captured images, e.g., in accordance with this disclosure. Output from image capture device 650 may be processed, at least in part, by video codec(s) 655 and/or processor 605 and/or graphics hardware 620, and/or a dedicated image processing unit or image signal processor incorporated within image capture device 650. Images so captured may be stored in memory 660 and/or storage 665. Memory 660 may include one or more different types of media used by processor 605, graphics hardware 620, and image capture device 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices;
   a user interface; and
   one or more processors operatively coupled to the memory, wherein the one or more processors are configured to execute instructions causing the one or more processors to:
   obtain a first neural network having a first network architecture, wherein the first network architecture is configured to perform a fusion operation and a denoising operation on sets of input images, and wherein the first network architecture comprises:

a first plurality of network layers configured to compute optical flow information between a first set of input images;

a second plurality of network layers configured to perform, at least in part, the fusion and denoising operations on the first set of input images; and a third plurality of skip connections between layers of the second plurality of network layers, wherein parameters for each skip connection of the third plurality of skip connections are warped based on at least part of the optical flow information computed by the first plurality of network layers; and use the first neural network to perform the fusion and denoising operations on the first set of input images.

2. The device of claim 1, wherein the first network architecture is further configured to perform temporal denoising prior to performing spatial denoising.

3. The device of claim 1, wherein the first network architecture is further configured to perform spatial denoising prior to performing temporal denoising.

4. The device of claim 1, wherein the first network architecture is further configured to perform the fusion operation and the denoising operation concurrently.

5. The device of claim 1, wherein the first network architecture further comprises an auxiliary loss function related to the fusion operation.

6. The device of claim 5, wherein the instructions further comprise instructions executable by the one or more processors to turn off the auxiliary loss function related to the fusion operation at a first time during a training of the first neural network.

7. The device of claim 1, wherein the first network architecture further comprises an auxiliary loss function related to the denoising operation.

8. The device of claim 1, wherein the first network architecture further comprises at least one confidence value parameter for at least part of the computed optical flow information.

9. A non-transitory computer readable medium comprising computer readable instructions executable by one or more processors to:

obtain a first neural network having a first network architecture, wherein the first network architecture is configured to perform a fusion operation and a denoising operation on sets of input images, and wherein the first network architecture comprises:

a first plurality of network layers configured to compute optical flow information between a first set of input images;

a second plurality of network layers configured to perform, at least in part, the fusion and denoising operations on the first set of input images; and a third plurality of skip connections between layers of the second plurality of network layers, wherein parameters for each skip connection of the third plurality of skip connections are warped based on at least part of the optical flow information computed by the first plurality of network layers; and use the first neural network to perform the fusion and denoising operations on the first set of input images.

10. The non-transitory computer readable medium of claim 9, wherein the first network architecture is further configured to perform temporal denoising prior to performing spatial denoising.

11. The non-transitory computer readable medium of claim 9, wherein the first network architecture is further configured to perform spatial denoising prior to performing temporal denoising.

12. The non-transitory computer readable medium of claim 9, wherein the first network architecture is further configured to perform the fusion operation and the denoising operation concurrently.

13. The non-transitory computer readable medium of claim 9, wherein the first network architecture further comprises an auxiliary loss function related to the fusion operation.

14. The non-transitory computer readable medium of claim 13, wherein the instructions further comprise instructions executable by the one or more processors to turn off the auxiliary loss function related to the fusion operation at a first time during a training of the first neural network.

15. The non-transitory computer readable medium of claim 9, wherein the first network architecture further comprises an auxiliary loss function related to the denoising operation.

16. The non-transitory computer readable medium of claim 9, wherein the first network architecture further comprises at least one confidence value parameter for at least part of the computed optical flow information.

17. An image processing method, comprising:

obtaining a first neural network having a first network architecture, wherein the first network architecture is configured to perform a fusion operation and a denoising operation on sets of input images, and wherein the first network architecture comprises:

a first plurality of network layers configured to perform, at least in part, the fusion and denoising operations on a first set of input images;

a second plurality of skip connections between layers of the first plurality of network layers; and a third plurality of network layers configured to compute optical flow information between the first set of input images, wherein parameters for each skip connection of the second plurality of skip connections are warped based on at least part of the optical flow information computed by the third plurality of network layers; and using the first neural network to perform the fusion and denoising operations on the first set of input images.

18. The method of claim 17, wherein the first network architecture is further configured to perform the fusion operation and the denoising operation concurrently.

19. The method of claim 17, wherein the first network architecture further comprises an auxiliary loss function related to the fusion operation or the denoising operation.

20. The method of claim 19, further comprising turning off the auxiliary loss function related to the fusion operation at a first time during a training of the first neural network.

* * * * *